(12) United States Patent
Woloschyn (10) Patent No.: US 12,455,352 B2
(45) Date of Patent: Oct. 28, 2025

(54) THREE-DIMENSIONAL SCANNING AND IMAGE RECONSTRUCTION THEREOF

(71) Applicant: FARO Technologies, Inc., Lake Mary, FL (US)

(72) Inventor: Andreas Woloschyn, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 1052 days.

(21) Appl. No.: 17/498,944

(22) Filed: Oct. 12, 2021

(65) Prior Publication Data

US 2022/0120863 A1 Apr. 21, 2022

Related U.S. Application Data

(60) Provisional application No. 63/092,808, filed on Oct. 16, 2020.

(51) Int. Cl.
  *G01S 7/481* (2006.01)
  *G01S 17/42* (2006.01)
  *G01S 17/89* (2020.01)

(52) U.S. Cl.
  CPC .......... *G01S 7/4813* (2013.01); *G01S 7/4817* (2013.01); *G01S 17/42* (2013.01); *G01S 17/89* (2013.01)

(58) Field of Classification Search
  None
  See application file for complete search history.

(56) References Cited

U.S. PATENT DOCUMENTS

| | | | |
|---|---|---|---|
| 9,903,950 B2 | 2/2018 | Walsh et al. | |
| 10,495,756 B2 | 12/2019 | Walsh et al. | |
| 2015/0015895 A1* | 1/2015 | Bridges | G01B 11/005 356/614 |
| 2019/0331911 A1* | 10/2019 | Scholl | G01S 7/4812 |
| 2020/0209394 A1 | 7/2020 | Mark et al. | |

* cited by examiner

*Primary Examiner* — Darryl V Dottin
(74) *Attorney, Agent, or Firm* — McCarter & English, LLP; Dave S. Christensen (57) ABSTRACT

Three-dimensional coordinate scanners and methods of scanning environments are described. The scanners include a housing having a top, a bottom, a first side, a second side, a first end face, and a second end face. A 3D point cloud system is arranged within the housing including a rotating mirror and configured to acquire 3D point cloud data of a scanned environment. A first color camera is arranged within the housing on the first side and configured to capture respective color data of the scanned environment and a second color camera arranged within the housing on the second side and configured to capture respective color data of the scanned environment.

20 Claims, 9 Drawing Sheets

THREE-DIMENSIONAL SCANNING AND IMAGE RECONSTRUCTION THEREOF

CROSS REFERENCE TO RELATED APPLICATIONS

This application claims the benefit of U.S. Provisional Application Ser. No. 63/092,808, filed Oct. 16, 2020, the entire disclosure of which is incorporated herein by reference.

BACKGROUND

The subject matter disclosed herein relates to systems and methods for measuring three-dimensional (3D) coordinates of a scanned environment, and in particular, to systems and methods for precision imaging and measurements employing auxiliary cameras and capturing color of a scanned environment.

Portable devices may be used to measure 3D coordinates. Some such portable devices may be laser scanners or the like that use time-of-flight techniques (e.g. laser trackers, laser scanners, time-of-flight cameras, etc.). These devices emit a light beam and measure the amount of time it takes for light to travel to the surface and return to the device to determine the distance. Typically, the time-of-flight scanner is stationary and includes mechanisms to rotate about two orthogonal axes to direct the light beam in a direction. By knowing the distance and the two angles, 3D coordinates may be determined.

During scanning operations, as described above, typical imaging is merely point cloud data (i.e., distance) with no image (e.g., color, gray-scale, etc.) associated therewith (e.g., image pixel data). If a color or other image-based rendition of a scanned environment is desired, post-processing and/or secondary imaging is required. For example, in a rotating mirror configuration, a second process of rotation-stop-color image may be performed after point-cloud data is obtained, and the color may be mapped to the point cloud data. Alternatively, one or more secondary cameras that capture color images may be employed to enable mapping of image data to the point cloud data. However, these configurations suffer from parallax issues that can result in a lack of color (image) information on parts of the point cloud. Hence, the need for improved image reconstruction methods and devices for such imaging exists.

BRIEF DESCRIPTION

According to some embodiments, three-dimensional coordinate scanners are provided. The scanners include a housing having a top, a bottom, a first side, a second side, a first end face, and a second end face, a 3D point cloud system within the housing and including a rotating mirror, the 3D point cloud system configured to acquire 3D point cloud data of a scanned environment, a first color camera arranged within the housing on the first side and configured to capture respective color data of the scanned environment, and a second color camera arranged within the housing on the second side and configured to capture respective color data of the scanned environment.

In addition to one or more of the features described above, or as an alternative, further embodiments of the scanners may include that the first color camera has a first optical axis projected in a first direction relative to the housing.

In addition to one or more of the features described above, or as an alternative, further embodiments of the scanners may include that the first optical axis has an angle of 34° relative to a horizontal plane, wherein the horizontal plane is parallel a surface on which the scanner is positioned.

In addition to one or more of the features described above, or as an alternative, further embodiments of the scanners may include that the first optical axis has an angle of 9° relative to a vertical plane, wherein the vertical plane is perpendicular to the horizontal plane.

In addition to one or more of the features described above, or as an alternative, further embodiments of the scanners may include that the second color camera has a second optical axis projected in a second direction relative to the housing.

In addition to one or more of the features described above, or as an alternative, further embodiments of the scanners may include that the second optical axis has an angle of 27° relative to a horizontal plane, wherein the horizontal plane is parallel a surface on which the scanner is positioned.

In addition to one or more of the features described above, or as an alternative, further embodiments of the scanners may include that the second optical axis has an angle of 9° relative to a vertical plane, wherein the vertical plane is perpendicular to the horizontal plane.

In addition to one or more of the features described above, or as an alternative, further embodiments of the scanners may include that the 3D coordinate scanner includes an internal color camera configured to capture zenith color data that is reflected on the mirror.

In addition to one or more of the features described above, or as an alternative, further embodiments of the scanners may include a zenith color camera within the housing on the top and configured to capture respective color data of the scanned environment.

In addition to one or more of the features described above, or as an alternative, further embodiments of the scanners may include that the first color camera has a field of view between +5° and +80° relative to a horizontal plane and the second color camera has a field of view between −65° and +10° relative to the horizontal plane.

In addition to one or more of the features described above, or as an alternative, further embodiments of the scanners may include a zenith color camera having a field of view between +77° and 90°.

In addition to one or more of the features described above, or as an alternative, further embodiments of the scanners may include that a field of view of the first color camera overlaps a field of view of the second color camera when pointing in the same direction.

According to some embodiments, methods of scanning environments are provided. The methods include performing a 3D point cloud data acquisition operation of a scanned environment using a 3D coordinate scanner, performing a first color data collection operation of the scanned environment using a first color camera positioned on a first side of the scanner, and performing a second color data collection operation of the scanned environment using a second color camera positioned on a second side of the scanner, opposite the first color camera.

In addition to one or more of the features described above, or as an alternative, further embodiments of the methods may include that the first color data collection operation and the second color data collection operation are performed simultaneously.

In addition to one or more of the features described above, or as an alternative, further embodiments of the methods may include that the first color data collection operation and the second color data collection operation are performed simultaneously with at least a portion of the 3D point cloud data acquisition operation.

In addition to one or more of the features described above, or as an alternative, further embodiments of the methods may include performing a zenith color data collection operation using the scanner to capture color data at a zenith relative to the scanner.

In addition to one or more of the features described above, or as an alternative, further embodiments of the methods may include that the zenith color data collection operation is performed using an internal camera within a housing of the scanner and reflected off a mirror of the environment scanner.

In addition to one or more of the features described above, or as an alternative, further embodiments of the methods may include that the zenith color data collection operation is performed using a color zenith camera arranged on a top of a housing of the scanner.

In addition to one or more of the features described above, or as an alternative, further embodiments of the methods may include that a plurality of first images are captured using the first color camera and a plurality of second images are captured using the second color camera, wherein a portion of each first image overlaps a portion of at least one second image.

In addition to one or more of the features described above, or as an alternative, further embodiments of the methods may include that a plurality of first images are captured using the first color camera and a plurality of second images are captured using the second color camera, wherein a portion of each first image overlaps a portion of at least one additional first image and a portion of each second image overlaps a portion of at least one additional second image.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments of the present disclosure provide improved scanning of shafts and similar structures using a single scanner configured to move through the structure and take continuous scans.

Figure 1A:
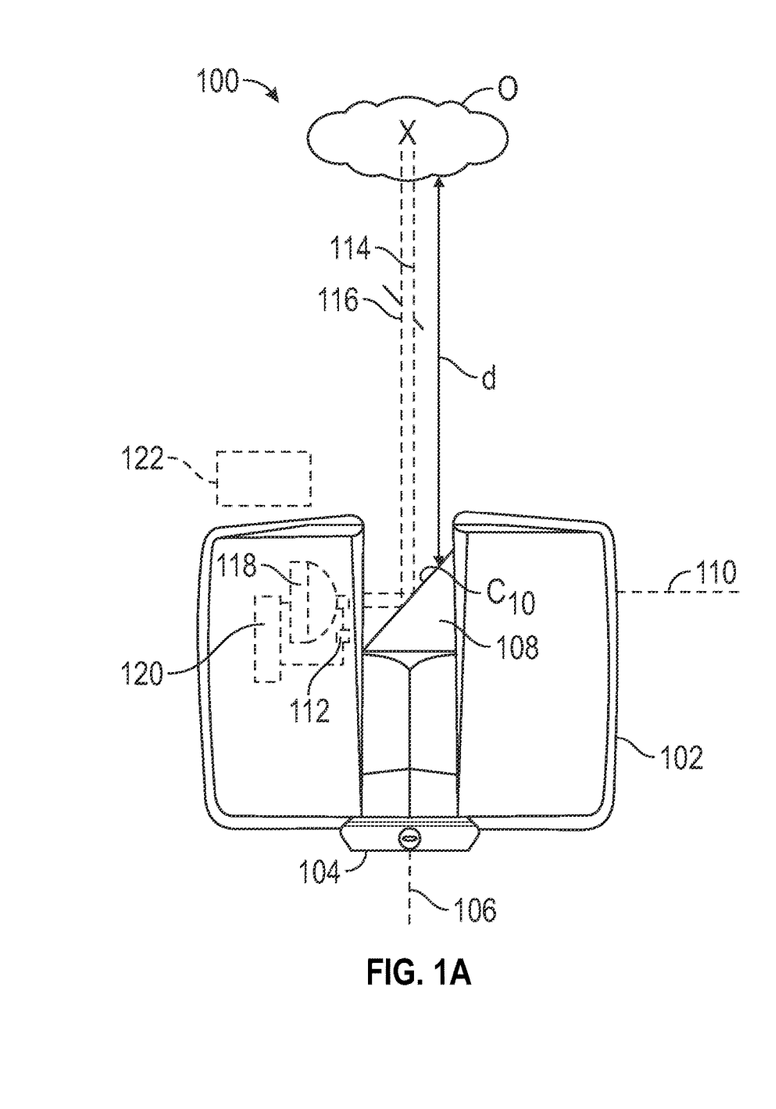
FIG. 1A is a side view of a 3D scanning system that may incorporate embodiments of the present disclosure.
Figure 1B:
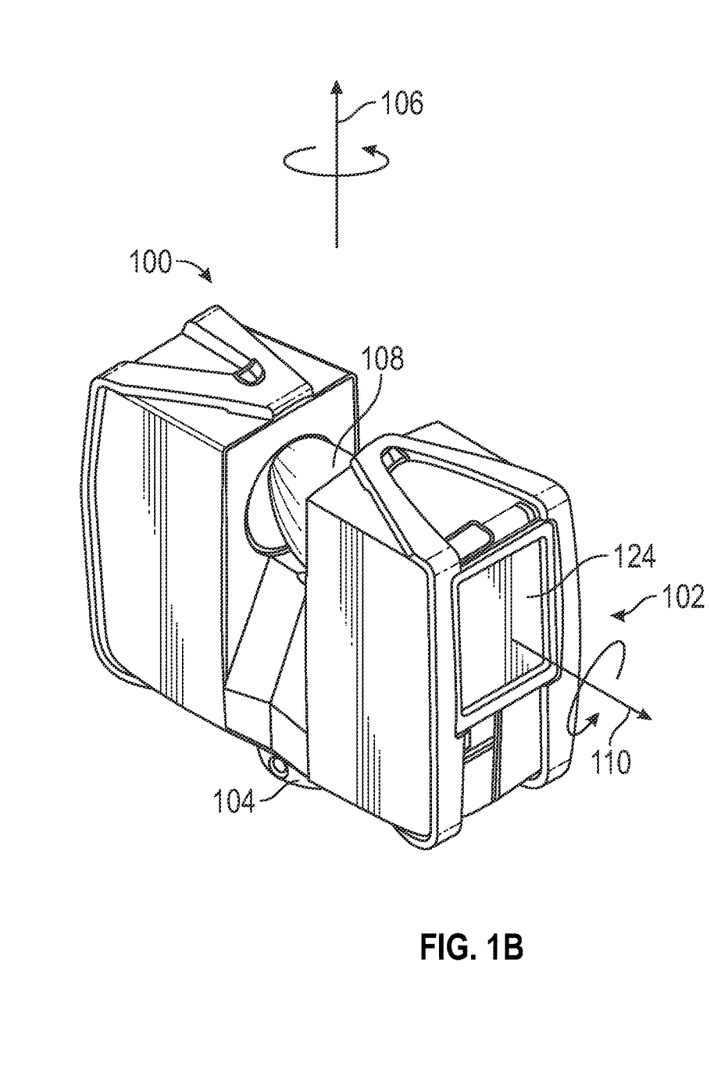
FIG. 1B is a perspective view of the 3D scanning system of FIG. 1A.

Referring to FIGS. 1A-1B, a 3D scanner 100 (e.g., a laser scanner) is shown that may be employed in embodiments of the present disclosure. The 3D scanner 100 may be used for optically scanning and measuring a scanned environment using laser based distance measurement methods. The 3D scanner 100 comprises a measuring head or housing 102 and a base 104. The housing 102 is mounted on the base 104 such that the housing 102 can rotate with respect to the base 104 about a first axis 106, driven by a first rotary drive (e.g., a motor). The rotation about the first axis 106 may be about the center of the base 104. The housing 102 comprises a mirror 108, which can rotate about a second axis 110, driven by a second rotary drive (e.g., a motor). Referring to a normal upright position of the 3D scanner 100, the first axis 106 may be called the vertical axis or azimuth axis and the second axis 110 may be called the horizontal axis or zenith axis. The 3D scanner 100 may comprise a gimbal point or center $C_{10}$ that is the intersection point of the first axis 106 and the second axis 110.

The housing 102 is provided with an electromagnetic radiation emitter 112, such as a light emitter, that emits an emission light beam 114. In an embodiment, the emission light beam 114 may be coherent light such as a laser. As will be appreciated by those of skill in the art, the laser beam may have a wavelength range of approximately 300 to 1600 nanometers, for example, 790 nanometers, 905 nanometers, 1550 nanometers, or less than 500 nanometers. It should be appreciated that other electromagnetic radiation beams having greater or smaller wavelengths may also be used. The emission light beam 114 may be amplitude or intensity modulated, for example, with a sinusoidal waveform, rectangular waveform, etc. Alternatively, the emission light beam 114 may be otherwise modulated, for example, with a chirp signal, or coherent receiver methods may be used. In the present embodiment, the emission light beam 114 is a continuous wave laser beam. However, it may also be a pulsed laser. The emission light beam 114 is emitted by the light emitter 112 onto the mirror 108, where it is deflected to the environment of the 3D scanner 100.

A reflected light beam, hereinafter called a reception light beam 116, is reflected from the scanned environment by an object O that is within the scanned environment. The reflected or scattered light is intercepted by the rotary mirror 108 and directed onto a light receiver 118 with reception optics. The directions of the emission light beam 114 and the reception light beam 116 result from the angular positions of the housing 102 and the minor 108 about the axes 106 and 110, respectively. The angular positions, in turn, depend on the corresponding rotary drives. The angle of rotation about the first axis 106 is measured by a first angular encoder. The angle of rotation about the second axis 110 is measured by a second angular encoder. The use of angular encoders is well understood and implementation thereof, along with the rotary drives or motors, will not be described further in order to simplify discussion of the present configuration.

A controller 120 is coupled to communicate with the light emitter 112 and the light receiver 118 inside the housing 102. It should be appreciated that while the controller 120 is illustrated as being a single device or circuit, this is for exemplary purposes and the claims should not be so limited. In other embodiments, the controller 120 may be comprised of a plurality of devices or circuits. In some embodiments, a portion of the controller 120 may be arranged outside the housing 102, for example, as a computer connected to the base 104 or other components of the 3D scanner 100.

The operation of the 3D scanner 100 is controlled by the controller 120. The controller 120 is a suitable electronic device capable of accepting data and instructions, executing the instructions to process the data, and, in some configurations, presenting the results. The controller 120 may accept instructions through a user interface, or through other means such as but not limited to electronic data card, voice activation means, manually-operable selection and control means, radiated wavelength and electronic or electrical transfer. The controller 120 may be and/or may include a microprocessor, microcomputer, a minicomputer, an optical computer, a board computer, a complex instruction set computer, an ASIC (application specific integrated circuit), a reduced instruction set computer, a computer network, a desktop computer, a laptop computer, a scientific computer, a scientific calculator, or a hybrid or combination of any of the foregoing.

The controller 120, in some embodiments, is capable of converting an analog voltage or current level provided by sensors (e.g., encoders) into digital signal(s). Alternatively, sensors may be configured to provide a digital signal to the controller 120, or an analog-to-digital (A/D) converter (not shown) maybe coupled between sensors and the controller 120 to convert the analog signal provided by sensors into a digital signal for processing by the controller 120. The controller 120 is configured to receive and use the digital signals as input to various processes for controlling the 3D scanner 100. The digital signals represent one or more system data including but not limited to angular position about the first axis 106, angular position about the second axis 110, time-of-flight of the light beams 114, 116, and the like.

In general, the controller 120 accepts data from sensors, light emitter 116 and light receiver 120, and is given certain instructions for the purpose of determining three-dimensional coordinates of points in the scanned environment. Further, the controller 120 may compare operational parameters to predetermined variances and if a predetermined variance is exceeded, the controller 120 can generate a signal that may be used to indicate an alarm to an operator. Additionally, the signal may initiate other control methods that adapt the operation of the laser scanner 100 such as changing or stopping the rotation about the first axis 106 once a predetermined angular position is achieved.

In some embodiments, the 3D scanner 100 may optionally include an imaging camera 122 that acquires two-dimensional (2D) color images of the scanned environment as a scan is performed. The 2D images may be synchronized with the acquired 3D coordinate points obtained by the 3D scanner 100. This allows for the association of a color and/or a texture with the 3D coordinate point by the controller 120. In some embodiments, the imaging camera 122 is disposed internally to the laser scanner 100 and acquires images via the mirror 108.

In addition to being coupled to one or more components within the 3D scanner 100, the controller 120 may also be coupled to external computer networks such as a local area network (LAN) and/or the Internet. A LAN interconnects one or more remote computers, which are configured to communicate with the controller 120 using a well-known computer communications protocol such as TCP/IP (Transmission Control Protocol/Internet Protocol), RS-232, ModBus, and the like. Additional systems, similar to 3D scanner 100 (i.e., multiple scanners), may be connected to a LAN with respective controllers. Each of the systems may be configured to send and receive data to and from remote computers and other systems. In some embodiments, the LAN may be connected to the Internet. An Internet connection can allow the controller 120 to communicate with one or more remote computers or other systems connected to the Internet.

The controller 120, in one non-limiting example, includes a processor coupled to a random access memory device, a non-volatile memory device, a read-only memory (ROM) device, one or more input/output controllers and/or elements as known in the art, and an optional LAN interface device via a data communications bus. In embodiments having a LAN interface device, the LAN interface device provides for communication between the controller and a network in a data communications protocol supported by the network, as noted above. The ROM device can be configured to store an application code, e.g., main functionality firmware, including initializing parameters, and boot code, for the processor of the controller 120. Application code also includes program instructions for causing the processor to execute any operation control methods of the 3D scanner 100, including starting and stopping operation, changing operational states of the 3D scanner 100, monitoring predetermined operating parameters, generation of alarms, etc. In an embodiment, the application code can create an onboard telemetry system that may be used to transmit operating information between the 3D scanner 100 and one or more remote computers or receiving locations. The information to be exchanged with remote computers and the 3D scanner 100 can include but are not limited to 3D coordinate data and images associated with a scanned environment.

The non-volatile memory device may be any form of non-volatile memory such as an EPROM (Erasable Programmable Read Only Memory) chip, a disk drive, or the like. Stored in the non-volatile memory device may be various operational parameters for the application code. The various operational parameters can be input to non-volatile memory device either locally, using a user interface or through use of a remote computer, or remotely via the Internet using a remote computer. It will be recognized that application code can be stored in non-volatile memory device or the read-only memory device of the 3D scanner 100.

The controller may include operational control methods embodied in application code. The methods are embodied in computer instructions written to be executed by the processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C#, Objective-C, Java, Javascript ALGOL (algorithmic language), BASIC (beginners all-purpose symbolic instruction code), visual BASIC, ActiveX, HTML (HyperText Markup Language), Python, Ruby, and/or, for example, any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In an embodiment, the controller of the 3D scanner 100 may be configured to process data furnished to generate the 3D scans from images or data captured by the light receiver 118. The 3D scans in turn are joined or registered in a common coordinate frame of reference. For registering, known methods can be used, such as by identifying natural or artificial targets (i.e., recognizable structures within a scanned environment) in overlapping areas of two or more frames captured by the light receiver 118. In an embodiment, multiple frames may be dynamically registered using a local bundle adjustment method. Through identification of these targets, the assignment of two 3D scans may be determined by means of corresponding pairs. A whole scene (i.e., a plurality of frames) is thus gradually registered by the 3D scanner 100. In some embodiments, the individual frames may be registered to a point cloud generated by a laser scanner.

In an embodiment, the controller 120 further includes an energy source, such as battery. The battery may be an electrochemical device that provides electrical power for the controller 120. In an embodiment, the battery may also provide electrical power to the 3D scanner 100 (e.g., cameras, sensors, motors, projectors, etc.). In some embodiments, the battery may be separate from the controller 120 (e.g. a battery pack). In an embodiment, a second battery (not shown) may be disposed in the housing 102 to provide electrical power to the other components of the 3D scanner 100 (e.g., cameras, sensors, motors, projectors, etc.). Alternatively, in some embodiments, power may be supplied from an outlet or other continuous power source, as will be appreciated by those of skill in the art.

It should be appreciated that while the controller 120 is illustrated as being installed within the housing 102, this is for exemplary purposes and the claims should not be so limited. In other embodiments, the controller 120 may be separate from the housing 102. Further, while embodiments herein illustrate the controller 120 as being part of a single 3D scanner 100, this is for exemplary purposes and the claims should not be so limited. In other embodiments, the controller 120 may be coupled to and combine three-dimensional coordinate data from multiple 3D scanners 100.

Referring again to FIG. 1A, the controller 120 includes operation control methods embodied in application code. The controller 120 is configured to perform operational control methods that determine, for a multitude of measuring points X, a corresponding number of distances d between the 3D scanner 100 and the measuring points X on object O in the scanned environment. The distance to a particular measuring point X is determined based at least in part on the speed of light in air through which electromagnetic radiation propagates from the 3D scanner 100 to the measuring point X In an embodiment, the phase shift in a modulated light beam 114, 116 sent to the measuring point X and received from it, is determined and evaluated to obtain a measured distance d.

The speed of light in air depends on the properties of the air such as the air temperature, barometric pressure, relative humidity, and concentration of carbon dioxide. Such air properties influence the index of refraction of the air. The speed of light in air is equal to the speed of light in vacuum divided by the index of refraction. A laser scanner of the type discussed herein is based on the time-of-flight of the light in the air (i.e., the round-trip time for the light to travel from the device to the object and back to the device (duration of light beam 114, 116)). A method of measuring distance based on the time-of-flight of light (or the time-of-flight of any type of electromagnetic radiation) depends on the speed of light in air and is therefore distinguishable from methods of measuring distance based on triangulation or other methods.

In an embodiment, the housing 102 may include a display device 124, as shown in FIG. 1B, integrated into the 3D scanner 100. The display device 124 can include a user interface, which may be a graphical touch screen. For example, the display device 124 may have a user interface that allows the operator to provide measurement instructions to the 3D scanner 100, in particular to set the parameters or initiate the operation of the 3D scanner 100, and the display device 124 may also display measurement results.

In an embodiment, the scanning of a scanned environment by the 3D scanner 100 may take place by rotating the mirror 108 relatively quickly about the second axis 110 while rotating the housing 102 relatively slowly about the first axis 106, thereby emitting the light 114 in a spiral pattern. In a non-limiting example, the rotary mirror 108 may be driven to rotate at a speed of 5820 revolutions per minute. A scan is defined to be the entity of measuring points X in such a measuring. For such a scan, the center $C_{10}$ defines the origin of the local stationary reference system. The base 104 rests in this local stationary coordinate frame of reference.

Figure 2:
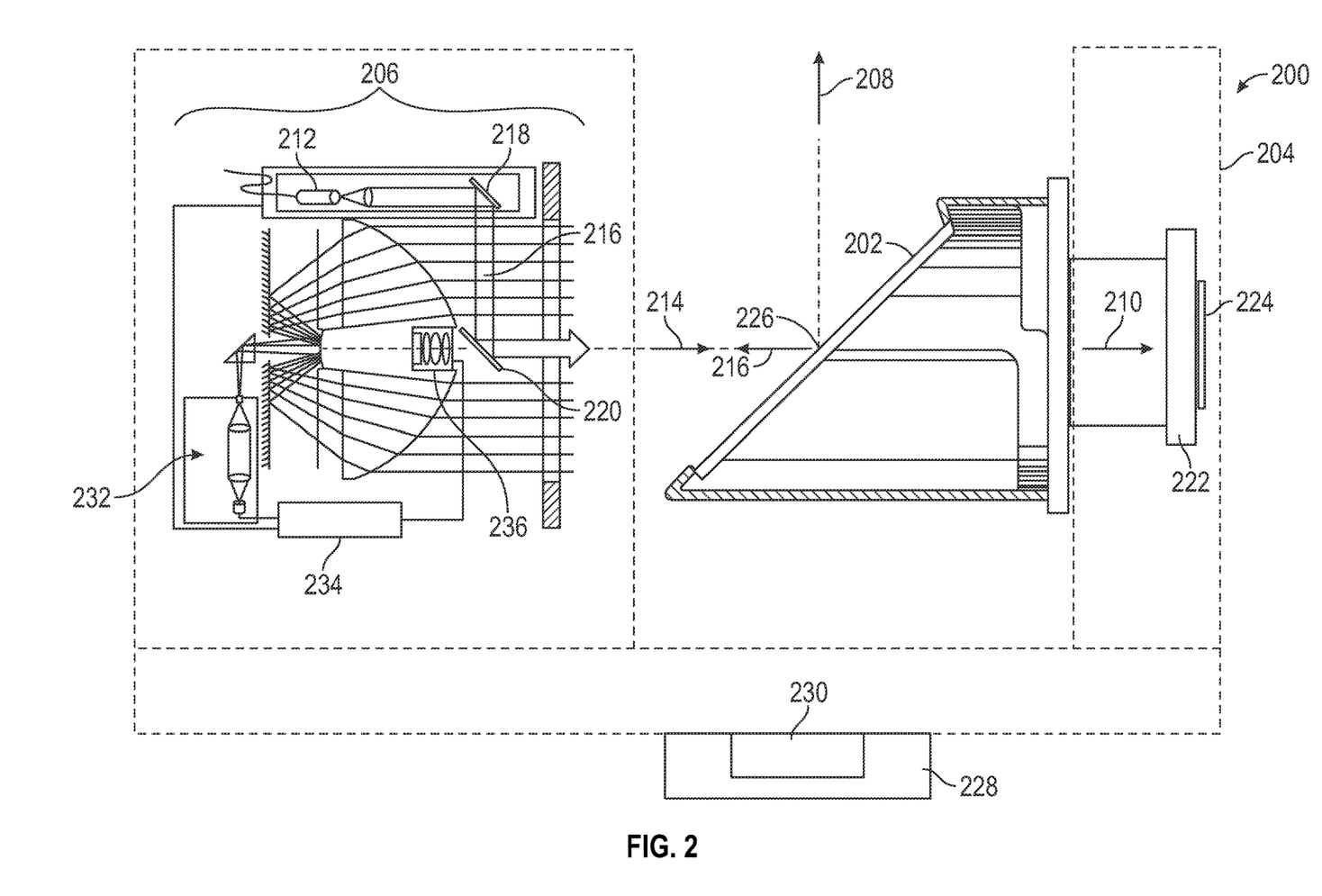
FIG. 2 is a schematic illustration of internal components of a 3D scanning system that may incorporate embodiments of the present disclosure.

Turning now to FIG. 2, a schematic illustration of a 3D scanner 200 that may incorporate embodiments of the present disclosure is shown. The 3D scanner 200 may be similar to that shown and described with respect to FIGS. 1A-1B and thus some features may not be discussed in detail again. In this illustrative embodiment, the 3D scanner 200 includes a rotary mirror 202 mounted within a housing 204. The 3D scanner 200 further includes a sensor assembly 206 arranged relative to the rotary mirror 202 such that light may be projected onto the rotary mirror 202 and light reflected thereon may be received at one or more light detectors of the sensor assembly 206. The housing 204 may be rotatable about a first axis 208 and the rotary mirror 202 may be rotatable about a second axis 210.

As shown, the sensor assembly 206 includes a light emitter 212. The light emitter 212 may be configured to emit and generate an emitted light beam 214 that is projected upon the rotary mirror 202, reflects off an object, and is subsequently reflected off of the rotary mirror 202 and back into the sensor assembly as a reflected light beam 216, as described above. In this embodiment, light 216 from the light emitter 212 reflects off a fixed mirror 218 and travels to dichroic beam-splitter 220 that reflects the light 216 from the light emitter 212 onto the rotary mirror 202. In this embodiment, the rotary mirror 202 is rotated by a motor 222 and the angular/rotational position of the rotary mirror 202 is measured by an angular encoder 224. Thus, the emitted light beam 214 may be reflected and direction about an environment in which the 3D scanner 200 is located. The 3D scanner 200 includes a gimbal point 226 that is a center of rotation about the first axis 208 and the second axis 210.

The housing 204 may be mounted to a base 228 configured to rotate the housing 204 about the first axis 208. The base 228 may include a respective angular encoder 230 configured to measure a rotation of the base 228 about the first axis 208. The combination of the rotation about the first axis 208 and the second axis 208, and projection of light and receipt thereof, enables scanning of an environment.

The sensor assembly 206 includes a light receiver 232. Coupled to the light emitter 212 and the light receiver 232 is a controller 234, as described above. The controller 234 is configured to determine, for a multitude of measuring points in an environment, a corresponding number of distances between the 3D scanner 200 and the points in the environment. The controller 234 is further configured to obtain or accept data from encoders 224, 230, light receiver 232, light source 212, and any additional components (e.g., auxiliary/imaging camera) and is given certain instructions for the purpose of generating a 3D point cloud of a scanned environment.

As shown, the 3D scanner 200 further includes an image acquisition device 236 (e.g., a central imaging camera) located internally to the housing 204 and may have the same optical axis as the 3D scanner device (e.g., second axis 210). In this embodiment, the image acquisition device 236 is integrated into the housing 204 (e.g., measuring head) and arranged to acquire images along the same optical pathway as an emitted light beam 214 and reflected light beam 216. In this configuration, the dichroic beam-splitter 220 allows light to pass through at wavelengths different than the wavelength of light 216 that is emitted from the light emitter 212. For example, the light emitter 212 may be a near infrared laser light (for example, light at wavelengths of 780 nm or 1150 nm), with the dichroic beam-splitter 220 configured to reflect the infrared laser light while allowing visible light (e.g., wavelengths of 500 to 700 nm) to transmit therethrough. In other embodiments, the determination of whether the light passes through the beam-splitter 220 or is reflected depends on the polarization of the light. The image acquisition device 236 can be configured to obtain 2D images of the scanned area to capture image data to add to the scanned image. In the case of a built-in imaging camera having an optical axis coincident with that of the 3D scanning device, the direction of the camera view may be easily obtained by simply adjusting the steering mechanisms of the scanner—for example, by adjusting the azimuth angle about the first axis 208 and by steering the rotary mirror 202 about the second axis 210.

Figure 3:
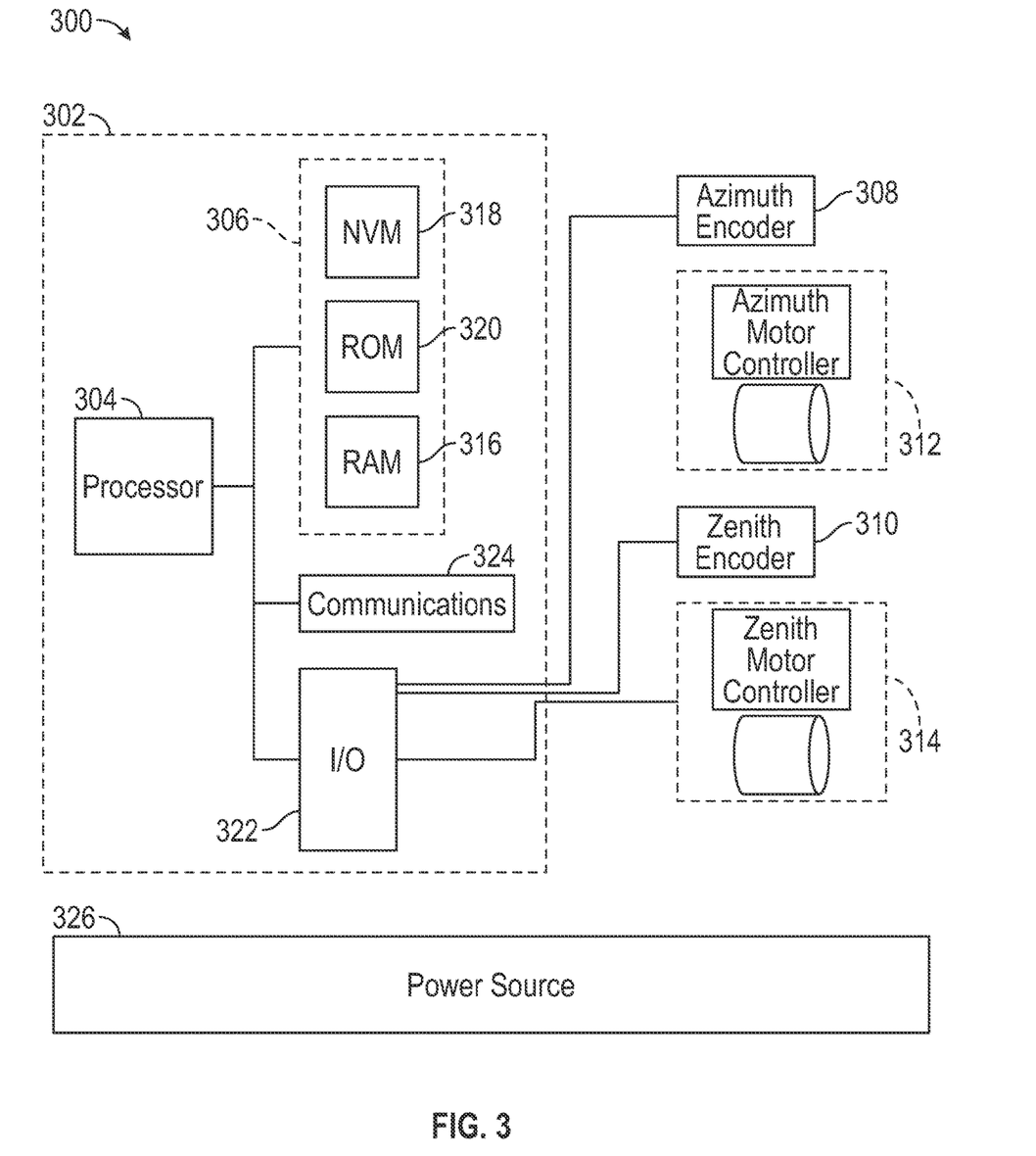
FIG. 3 is a schematic illustration of components and orientation thereof of a 3D scanner that may incorporate embodiments of the present disclosure.

Referring now to FIG. 3, elements of a laser scanner 300 that may incorporate embodiments of the present disclosure are shown. The laser scanner 300 may be employed and configured, for example, similar to the systems shown and described above with respect to FIGS. 1 and 2. A controller 302 is provided within the laser scanner 300. The controller 302 is a suitable electronic device capable of accepting data and instructions, executing the instructions to process the data, and presenting the results. The controller 302 includes one or more processing elements, such as a processor 304. The processor 304 may be one or more of microprocessors, field programmable gate arrays (FPGAs), digital signal processors (DSPs), and generally any devices capable of performing computing functions. The processor 304 can have access to or may be operably connected to a memory 306 configured to store information and data.

The controller 302, in some embodiments, is configured to convert an analog voltage or current level provided by a light receiver into a digital signal to determine a distance from the laser scanner 300 to an object in an environment. The controller 302 is configured to employ or process digital signals that act as input to various processes for controlling the laser scanner 300. The digital signals represent data including, but not limited to, distance to an object, images of the environment, images acquired by a panoramic camera, angular and/or rotational measurements by a first axis or azimuth encoder 308, and angular and/or rotational measurements by a second axis or zenith encoder 310.

In general, the controller 302 accepts data from the encoders 308, 310, a light receiver, a light source, and a panoramic camera and is given certain instructions for the purpose of generating a 3D point cloud of a scanned environment. The controller 302 is configured to provide operating signals to the light source, the light receiver, the panoramic camera, an azimuth motor controller 312, and a zenith motor controlled 314. The controller 302 is configured to compare operational parameters to predetermined variances and, if the predetermined variance is exceeded, the controller 302 is configured to generate a signal that alerts an operator to a condition. The data received by the controller 302 may be displayed on a user interface coupled to controller 302. The user interface may be one or more LEDs (light-emitting diodes) or LED display, an LCD (liquid-crystal diode) display, a CRT (cathode ray tube) display, a touch-screen display, or the like. A keypad may also be coupled to the user interface for providing data input to the controller. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 300.

The controller 302 may also be coupled to one or more external computer networks such as a local area network (LAN) and the Internet. A LAN interconnects one or more remote computers, which are configured to communicate with controller 302 using a well-known computer communications protocol such as TCP/IP (Transmission Control Protocol/Internet(ˆ) Protocol), RS-232, ModBus, and the like. Additional systems may also be connected to LAN with a controller in each of these systems being configured to send and receive data to and from remote computers and other systems. The LAN may be connected to the Internet. This connection may be configured to allow the controller 302 to communicate with one or more remote computers connected to the Internet.

The processor 304, as noted above, is coupled to the memory 306. The memory 306 may include one or more random access memory (RAM) devices 316, one or more non-volatile memory (NVM) devices 318, and/or one or more read-only memory (ROM) devices 320. In addition, the processor 304 may be connected to one or more input/output (I/O) controllers 322 and a communications circuit 324. In an embodiment, the communications circuit 324 is configured to provide an interface that allows wireless or wired communication with one or more external devices or networks, such as the LAN discussed above. The laser scanner 300 may include or be electrically connected a power source 326, which is configured to supply electrical power to the various electronic components and devices of the laser scanner 300.

The laser scanners described above may be employed with embodiments of the present disclosure to perform scanning of shafts and similar structures. Such laser scanners can include software for performing operations. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

In conventional systems that obtain both 3D point cloud data and color data, color capturing requires additional time after the 3D point cloud scan. The color data may be obtained using the rotating mirror of the system and a color image sensor is arranged to receive incoming color image data. That is, a post-scan color imaging process is performed, and the two data sets may be aligned or correlated to have color data assigned to the 3D point cloud data. Such secondary color scanning may require fifty or more pictures which are individually captured after the 3D point cloud data is collected. Such secondary color scanning process can add additional time and effort to the scanning processes.

Embodiments of the present disclosure are directed to taking color pictures using color cameras attached to the scanner to improve color capture after a scanner collects 3D point cloud data. In accordance with some embodiments of the present disclosure, external cameras can be used to capture a panorama image using significantly fewer color image captures than that previously performed. In some embodiments, if each external camera may have a total vertical field of view of 150° relative to the scanner body. From this, a series of vertical field of view images may be captured (e.g., six from each camera) and a substantially complete panorama horizontal image may be captured of color data of an environment. One or more zenith images may be captured to provide a complete three-dimensional color image capture. As such, color capturing processes can be incorporated into the 3D point cloud data scan, thereby eliminating extensive additional image capture steps.

Figure 4A:
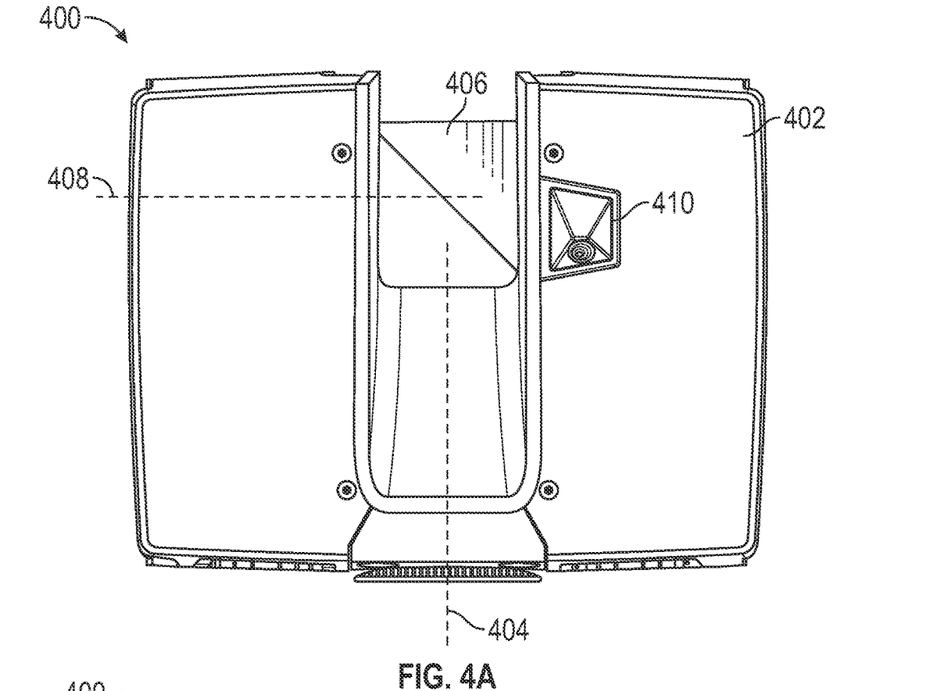
FIG. 4A is a schematic illustration of an environment scanner in accordance with an embodiment of the present disclosure illustration a first side thereof.
Figure 4B:
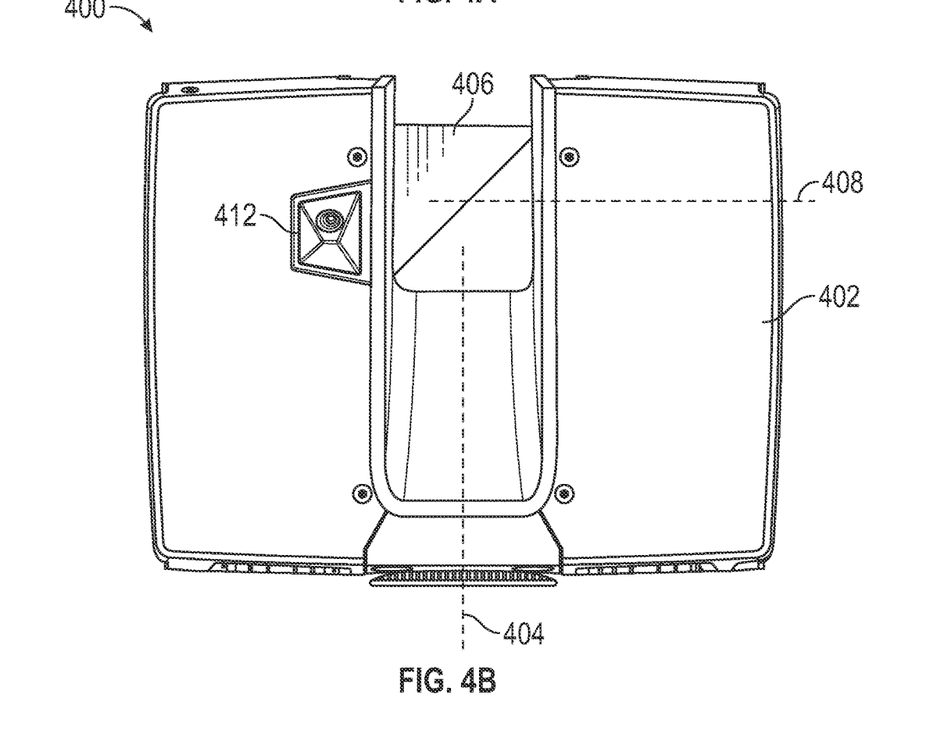
FIG. 4B illustrates a second side of the environment scanner of FIG. 4A.

Turning now to FIGS. 4A-4B, schematic illustrations of an environment scanner 400 in accordance with an embodiment of the present disclosure are shown. FIG. 4A illustrates a first side view of the environment scanner 400 and FIG. 4B illustrates a second side view of the environment scanner 400. The environment scanner 400 is configured to capture 3D point clouds data and may be substantially similar to the scanners shown and described above.

The environment scanner 400 includes a measuring head or housing 402 that may be mounted to, affixed to, or otherwise include a base for rotating the housing about a first axis 404. The rotation of the housing 402 about the first axis 404 may be driven by a first rotary drive (e.g., a motor). The environment scanner 400 includes a mirror 406 mounted within the housing 402 and configured to rotate about a second axis 408, driven by a second rotary drive (e.g., a motor). Referring to a normal upright position of the environment scanner 400, the first axis 404 may be called the vertical axis or azimuth axis and the second axis 408 may be called the horizontal axis or zenith axis. The environment scanner 400 may include a gimbal point or center that is the intersection point of the first axis 404 and the second axis 408.

The environment scanner 400 may include various internal components, including, but not limited to, the mentioned motors configured for rotating the housing 402 and/or the mirror 406, one or more light sources for projecting light onto the mirror 406 and into a scanned environment, and one or more light receivers for receiving reflected light. The environment scanner 400 may thus be configured to obtaining 3D point cloud data of a scanned environment.

The environment scanner 400 of FIGS. 4A-4B also includes color cameras that are integrated into or otherwise mounted to the environment scanner 400 (e.g., arranged within the housing 402). As shown in FIG. 4A, on a first side of the environment scanner 400, the environment scanner 400 includes a first color camera 410. A second color camera 412 is arranged on a second side of the environment scanner 400 opposite the first color camera 410. In this illustrative embodiment, the first color camera 410 is oriented to be directed upward relative to the housing 402 (or upward relative to the first axis 404). The second color camera 412 is oriented to be directed downward relative to the housing 402 (or downward relative to the first axis 404). As used herein the term "upward" refers to a direction away from the surface that the scanner 400 is positioned (e.g. away from the floor). As used herein the term "downward" refers to a direction towards the surface that the scanner 400 is positioned (e.g. towards the floor).

The color cameras 410, 412 are configured to capture images of a scanned environment as the environment scanner 400 is rotated about the first axis 404. The number of color images captured by the color cameras 410, 412 may be based on the field of view of each respective color camera 410, 412. For example, if each color camera 410, 412 has a horizontal field of view of about 60°, six images from each color camera 410, 412 will complete a 360° panoramic. If each color camera 410, 412 has a horizontal field of view of about 45°, eight images from each color camera 410, 412 may be combined to generate complete a 360° panoramic image.

The color cameras 410, 412 may be arranged and oriented such that a portion of an image captured by the first color camera 410 will overlap with a portion of an image captured by the second color camera 412 (e.g., in the vertical direction). Accordingly, a full panoramic color capture may be obtained using the environment scanner 400, thus eliminating an extensive separate color image capture operation. In some embodiments, the overlap between the vertical field of view of the two cameras 410, 412 may be 5°, 8°, or more. In one non-limiting example, the first color camera 410 may have a vertical field of view extending between −65° to +10°, relative to horizontal, and the second color camera 412 may have a field of view between +5° and +80°, relative to horizontal. In some such embodiments, an internal color camera may be used to capture a color zenith image covering a field of view of between +77° and +90°, relative to horizontal. In other embodiments, for example, a third color camera may be mounted on a top surface of the housing 402 to capture a color zenith image. The internal color camera may be used to capture the color zenith image by arranging the mirror 406 at a 45° angle such that light from directly about the environment scanner 400 will be captured by the internal color camera.

As shown in FIGS. 4A-4B, and in accordance with some embodiments, the two color cameras 410, 412 may be arranged on the same side of the housing 402 relative to the mirror 406 or relative to the first axis 404. Advantageously, such configuration can reduce the amount of electronics and/or associated components (e.g., wiring) needed for inclusion of the color cameras 410, 412 as part of the environment scanner 400.

Figure 5:
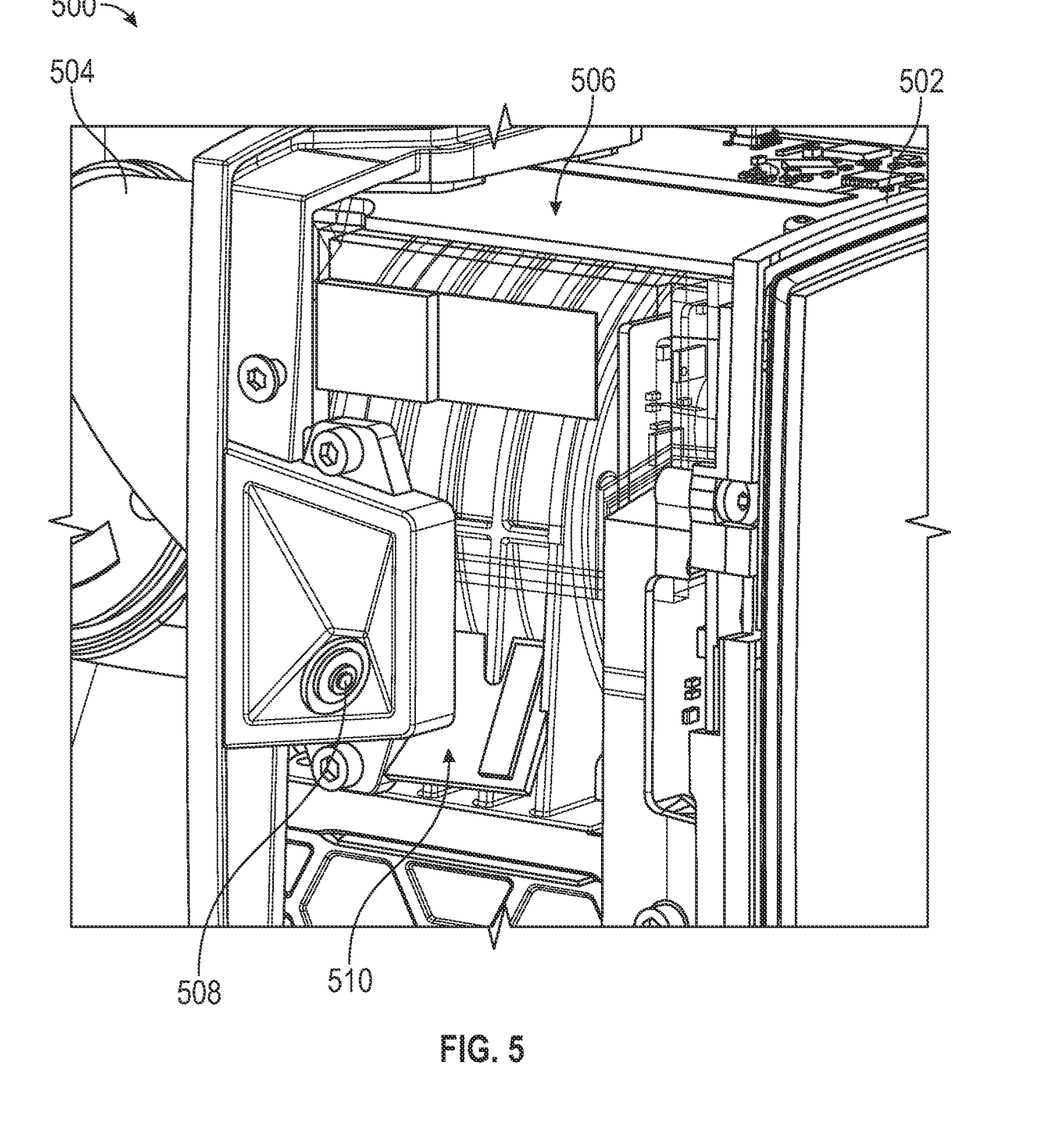
FIG. 5 is a schematic illustration of components of an environment scanner in accordance with an embodiment of the present disclosure.

Turning to FIG. 5, a schematic illustration of a portion of an environment scanner 500 in accordance with an embodiment of the present disclosure. The environment scanner 500 may be similar to that shown and described above, having a housing 502 with a mirror 504 configured to rotate within the housing 502. The environment scanner 500 includes internal electronics 506, such as that shown and described above. As shown, the environment scanner 500 includes a color camera 508 mounted to the housing 502 and having color camera electronics 510. In some embodiments, the color camera 508 may be arranged and located next to an embedded onboard computer module of the environment scanner 500. An electronic high-speed camera data interface connector maybe used to connect the color camera 508 to the internal electronics 506, such as the embedded onboard computer module. As similar arrangement may be used on a side opposite that shown, for a second color camera mounted within and to the housing 502.

Figure 6:
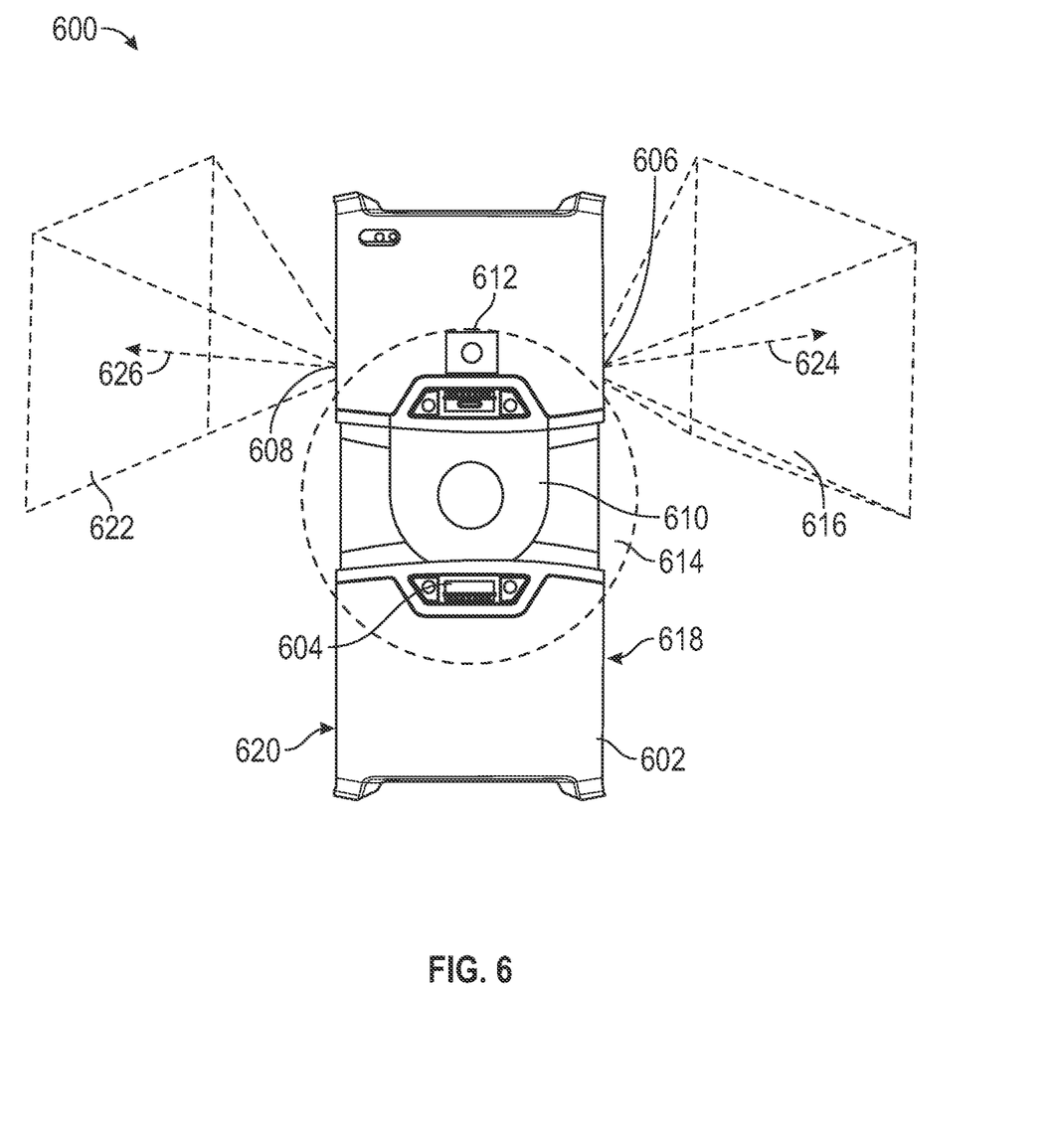
FIG. 6 is a schematic illustration of an environment scanner in accordance with an embodiment of the present disclosure and fields of view associated therewith.

Turning now to FIG. 6, a schematic illustration of an environment scanner 600 in accordance with an embodiment of the present disclosure is shown. The environment scanner 600 includes a housing 602 having an internal color camera 604, a first color camera 606, and a second color camera 608. The internal color camera 604 is arranged to collect an image based on a reflection from a mirror 610. In this illustrative embodiment, the environment scanner 600 may include an optional zenith color camera 612 which may be used in combination with or alternatively to the internal color camera 604.

As shown, the internal color camera 604 has a respective field of view 614 that is cone-like shape extending upward from the mirror 610 (e.g., pyramid shape and stitched to form a cone field of view). The first color camera 606 has a respective field of view 616 projecting from a first side 618 of the housing 602 and the second color camera 608 has a respective field of view 620 projecting from a second side 622 of the housing 602, opposite the first side 618. The field of view 616 of the first color camera 606 is projected along a first optical axis 624 and the field of view 620 of the second color camera 608 is projected along a second optical axis 626. The optical axes 624, 626 are lines projected normal from an image sensor of the respective color cameras 606, 608. The optical axis of the internal color camera 604 (or the optional zenith color camera 612) is normal to the page of FIG. 6, with the optical axis of the internal color camera 604 changing direction by 90° due to reflection upon the mirror 610.

In some embodiments, the first and second color cameras 606, 608 may be angled relative to a horizontal plane. For example, the first optical axis 624 may be angled upward from horizontal by an angle between +20° and +40° and the second optical axis 626 may be angled downward from horizontal by an angle between −20° and −40°. In one non-limiting example, the first optical axis 624 may be arranged at +34° relative to horizontal and the second optical axis 626 may be arranged at −27° relative to horizontal. Moreover, in some embodiments, the optical axes 624, 626 may be angled relative to a vertical plane the intersects both the first side 618 and the second side 620 of the housing 602. In some such configurations, each of the first optical axis 624 and the second optical axis 626 may be angled by an angle between 5° and 15° relative to the vertical plane intersecting both the first side 618 and the second side 620 of the housing 602.

In one non-limiting example, the field of view 614 of the internal color camera 604 (e.g., zenith field of view) may cover between +77° to +90° in the vertical field of view, the first color camera 606 may cover between +5° to +80° in the vertical field of view, and the second color camera 608 may cover between −65° to +10° in the vertical field of view. As such, the three cameras 604, 606, 608 may obtain color data and information for a vertical field of view from −65° to +90°, with at least some amount of overlap from one field of view to the next.

Figure 7A:
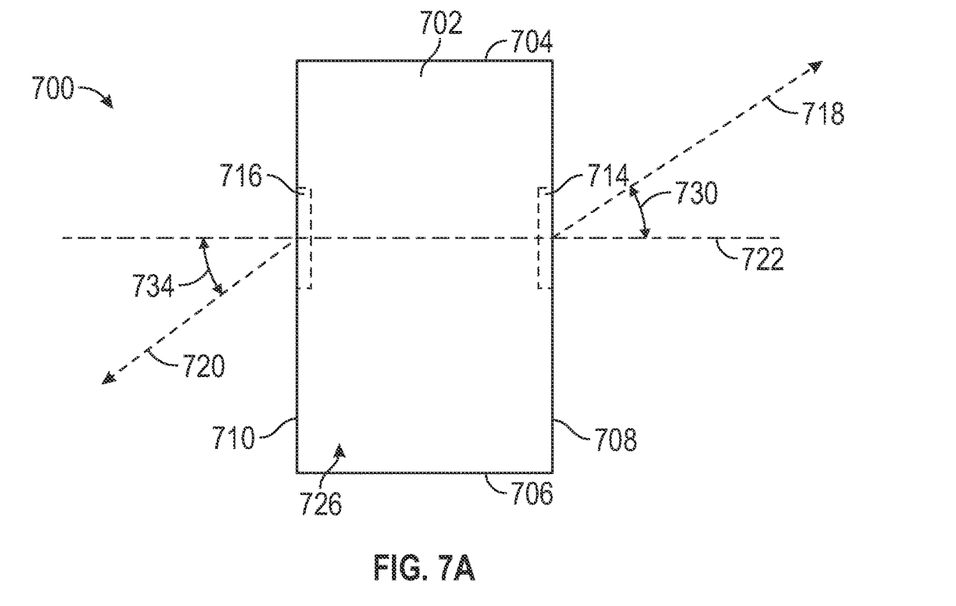
FIG. 7A is a front elevation view of an environment scanner in accordance with an embodiment of the present disclosure illustrating optical axes thereof.
Figure 7B:
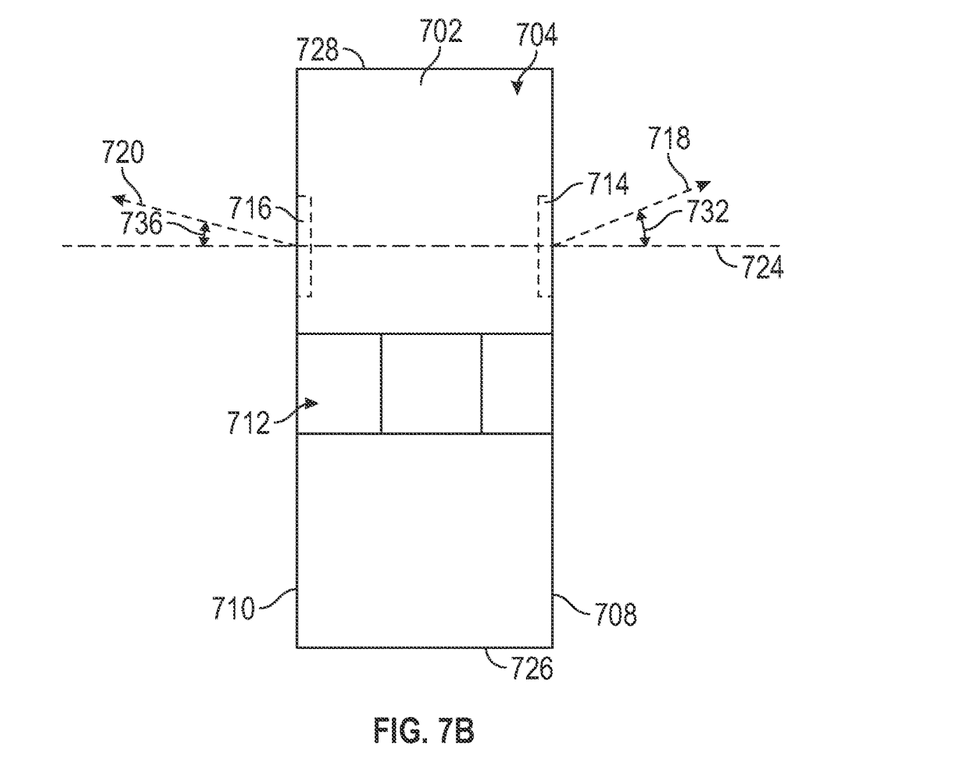
FIG. 7B is a top down plan view of the environment scanner of FIG. 7A illustrating the optical axes thereof.

Turning to FIGS. 7A-7B, schematic illustrations of an environment scanner 700 in accordance with an embodiment of the present disclosure are shown. The environment scanner 700 includes a housing 702 having a top 704, a bottom 706, a first side 708, and a second side 710. FIG. 7A is a front elevation view of the environment scanner 700 and FIG. 7B is a top down plan view of the environment scanner 700. The environment scanner 700 includes a 3D point cloud system 712 (e.g., internal imaging components and a rotating mirror), similar to that shown and described above, along with a first color camera 714 arranged on the first side 708 and a second color camera 716 arranged on the second side 710.

The first color camera 714 has a first optical axis 718 projecting from the first color camera 714 in a direction normal to an image sensor of the first color camera 714. Similarly, the second color camera 716 has a second optical axis 720 projecting from the second color camera 716 in a direction normal to an image sensor of the second color camera 716. In this embodiment, the two color cameras 714, 716 are arranged along a horizontal plane 722 and a vertical plane 724. The horizontal plane 722 and the vertical plane 724 intersect each other, and the line defined by the intersecting planes 722, 724 passes through each of the first color camera 714 and the second color camera 716 and the respective optical axes 718, 720 project from this intersecting line. The horizontal plane 722 is a plane that is parallel with the top 704 and the bottom 706 of the housing 702 and the vertical plane 724 is a plane that is parallel with a first end face 726 and a second end face 728 of the housing 702.

The first optical axis 718 is arranged to project from the first color camera 714 at a respective first orientation angle 730 relative to the horizontal plane 722 and a respective second orientation angle 732 relative to the vertical plane 724. Similarly, the second optical axis 720 is arranged to project from the second color camera 716 at a respective first orientation angle 734 relative to the horizontal plane 722 and a respective second orientation angle 736 relative to the vertical plane 724. In one non-limiting example, the first orientation angle 730 of the first color camera 714 is 34° relative to the horizontal plane 722 in a direction toward the top 704 of the housing 702 and the second orientation angle 732 of the first color camera 714 is 9° relative to the vertical plane 724 toward the second end face 728. In one non-limiting example, the first orientation angle 734 of the second color camera 716 is 27° relative to the horizontal plane 722 in a direction toward the bottom 706 of the housing 702 and the second orientation angle 736 of the second color camera 716 is 9° relative to the vertical plane 724 toward the second end face 728. The above described angles are merely for example, and other orientation angles may be employed without departing from the scope of the present disclosure. It will be appreciated that the orientation angles may be based, in part, upon a field of view of the respective color cameras and may be determined to ensure at least some overlap occurs between two images taken in the same direction from the two separate color cameras.

Figure 8:
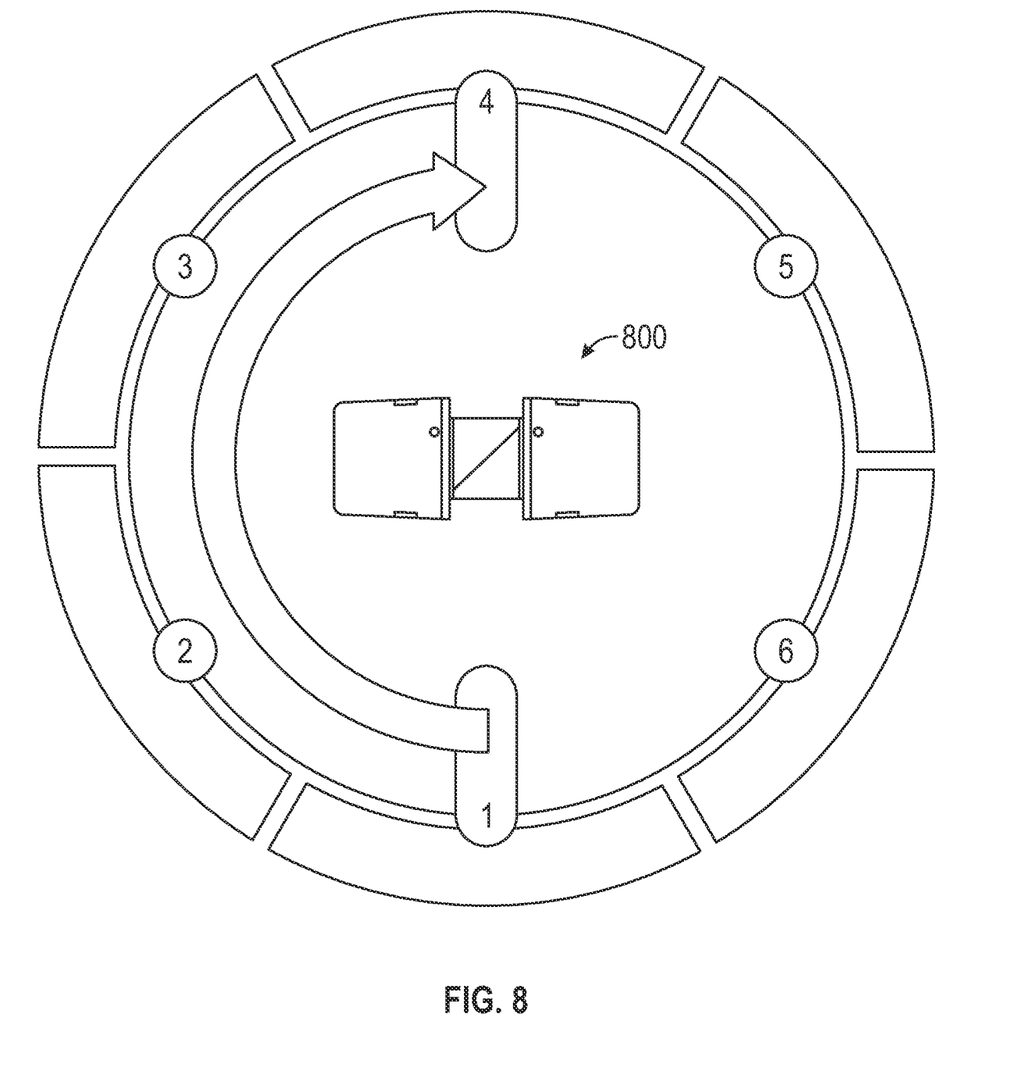
FIG. 8 is a schematic diagram of a color data capture operation in accordance with an embodiment of the present disclosure.

Turning now to FIG. 8, a schematic diagram of a color image capture process in accordance with an embodiment of the present disclosure is shown. The color image capture process employs an environment scanner 800 configured with two side color cameras, such as shown and described above. The environment scanner 800 may be used to perform a 3D point cloud data collection regarding an environment. After completion of the 3D point cloud data, the environment scanner 800 may be rotated to specific positions or orientations and the two side color cameras may be used to capture color images of the environment. In this embodiment, the environment scanner 800 is configured to be rotated to six orientations or positions. In Position 1, a first color camera will capture a color image in a direction toward the "1" point, and a second color camera will capture a color image in a direction toward the "4" point. The first color camera may be oriented upward relative to a horizontal plane and the second camera may be oriented downward relative to the horizontal plane.

The environment scanner 800 may then be rotated to Position 2, with the first color camera capturing an image in a direction toward the "2" point, and the second color camera captures an image in a direction toward the "5" point. The environment scanner 800 may then be rotated to Position 3, with the first color camera capturing an image in a direction toward the "3" point, and the second color camera captures an image in a direction toward the "6" point. This process may be repeated for each Position 3, 4, 5, and 6, such that each of the first color camera and the second color camera obtain a 360° panorama of the scanned environment. With this color data collection, it may not be possible to capture the color data of the environment directly above the environment scanner (e.g., zenith color data). Accordingly, during one or more of the instances of the side color data collection using the two side cameras, an internal color camera (or a top-mounted color camera) may be used to capture the zenith color data.

In one example of operation, the color capturing may be obtained at Position 1, with Position 1 being a scanner initial position and scanner rotation has not started yet. The scanner is then rotated to obtain 3D point cloud data through Positions 2-4, with color capture performed when the scanner is at Positions 2, 3, and 4 during the scan. After the 3D point cloud data is obtained, the scanner may be rotated to Positions 5 and 6, where color capturing is obtained after the 3D point cloud data scan is completed.

Figure 9:
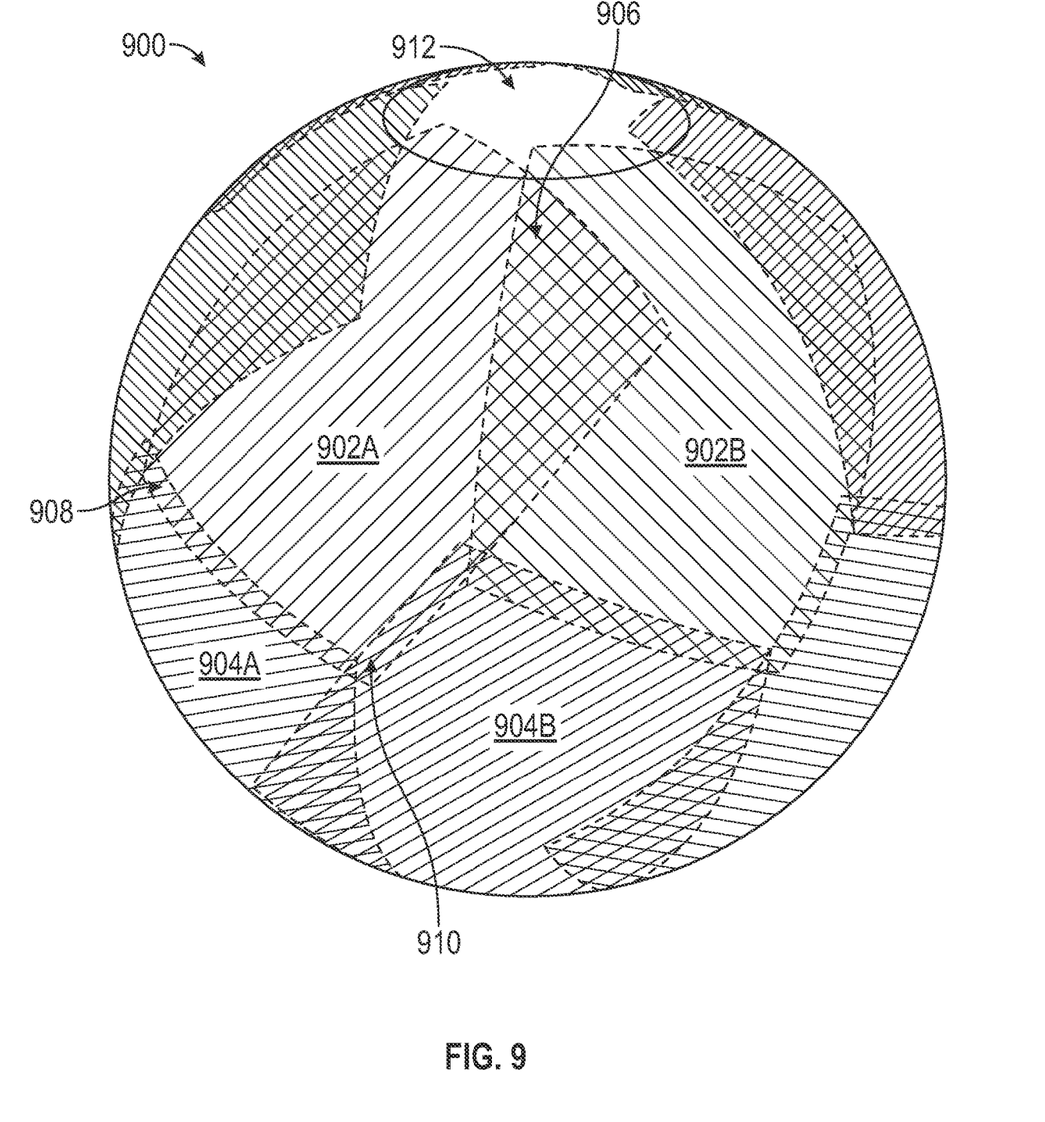
FIG. 9 is a schematic color data mosaic of images captured using color cameras of an environment scanner in accordance with an embodiment of the present disclosure The detailed description explains embodiments of the disclosure, together with advantages and features, by way of example with reference to the drawings.

Turning now to FIG. 9, a schematic color data mosaic 900 of images captured using color cameras of an environment scanner in accordance with an embodiment of the present disclosure is shown. The color data mosaic 900 comprises a number of first color images 902A, 902B, etc. and a number of second color images 904A, 904B, etc. The first color images 902A, 902B, etc. may be obtained using a first color camera on a first side of the environment scanner and the second color images 904A, 904B, etc. may be obtained using a second color camera on a second side of the environment scanner. As shown, the first color images 902A, 902B, etc. span a top portion of the color data mosaic 900 and the second color images 904A, 904B, etc. span a bottom portion of the color data mosaic 900. This orientation may be based on the orientation/angle of a color image sensor of each color camera. The number of first color images and second color images may be based, in part, on the field of view of each respective color camera, with more images collected if the field of view is relatively small and the number of images being relatively small if the field of view is relative larger. That is, the required number of images to be collects is inversely proportional to the size of the field of view of the color cameras.

As shown in FIG. 9, two adjacent first color images 902A, 902B have a region of overlap 906 preventing any missed color data horizontally within the color data mosaic 900. The overlap 906 between adjacent first color images 902A, 902B, etc. may be provided, in part, due to an angling or tilt of the images relative to horizontal. The tilt of the images may be between 5° and 30°, for example, although any amount of tilt may be used as desired. In one non-limiting example, the tilt may be 18°. In some embodiments, the cameras may be rotated 16° clockwise from an upright position, or any other rotation from an upright position (clockwise or counterclockwise).

Also shown, the first color image 902A has regions 908, 910 of overlap vertically with at least two adjacent second color images 902A, 902B. The vertical overlap regions 908, 910 may be any amount of overlap, for example, 4°, 8°, or more. This ensures no color data is missed vertically within the color data mosaic 900. As a result, each color image may overlap with four or more other color images (two in the horizontal direction and two in the vertical direction). In other configurations, depending upon the shape and orientation of each color image, more or fewer regions of overlap may be employed.

As show, a zenith 912 of the color data mosaic 900 is blank and not captured by the first and second color images 902A, 902B, etc., 904A, 904B, etc. To obtain color data associated with the zenith 912, one or more color data pictures may be obtained using an internal camera (reflected off a mirror oriented to position the field view of the internal camera in an area above the scanner) or a top mounted color camera. The zenith color image may be captured and have overlap with one or more of the first color images 902A, 902B, etc.

In accordance with embodiments of the present disclosure, the side color cameras may be integrated into and installed within a housing of the environment scanner. Advantageously, this configuration enables simplified electronics and data processions, as all images may be captured from the same device.

In one non-limiting example, the side color cameras may include various imaging chips having megapixel image resolution. The internal color camera, which may capture images reflected off a mirror, may include a lens system with a specific or predetermined field of view beneficial to capture the spherical view of color data.

Using the above described system, eight pictures can be obtained using each side color camera to compose a panorama (e.g., every 45°) with a minimum required overlap for image stitching between adjacent images (e.g., an overlap of 2°, 3°, 4°, or more). One or more zenith images may be captured, completing the color data collection. In some embodiments, a single zenith image capture may have a field of view of between 77° and 90°. If the number of zenith images is increased (e.g., taken at different positions) the field of view of the zenith color data may be increased to suitable larger angles (e.g., up to 90°).

The color data may then be mapped or otherwise associated with 3D point cloud data to enable 3D color reconstruction or mapping of a scanned environment.

Although described with the color data capture occurring after a 3D point cloud data scan, in some configurations, the side color cameras may be operated to capture color images during the 3D point cloud data scan, thus reducing the amount of time the color data collection process takes. In some such embodiments, some color images may be required to be obtained post-scan, and the zenith image mage be obtained at any time, using an internal color camera and/or a top-mounted color camera.

Technical effects and benefits of some embodiments include an environment scanner having integrated body cameras configured to collect color data related to a scanned environment. In some embodiments, the color cameras may be mounted on opposing sides of a scanner housing and arranged to capture color data during or after a 3D point cloud data scan. These additional cameras can reduce the amount of time that is required to collect color data associated with an environment. For example, if color data is obtained only with an internal camera using a reflection from a rotating mirror, 66 or more images may be required to capture a full mosaic of color data. This is due, in part, to a limited field of view of the internal camera, and the necessity to rotate both the housing and the mirror to enable capture of color data associated with an environment. However, using color cameras, and cameras having relatively large fields of view, a significantly lower number of color images may be required thus reducing the time required to capture color data of an environment.

The terms "about" and "substantially" are intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently (or simultaneously), or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A three-dimensional (3D) coordinate scanner comprising:
    a housing having a top, a bottom, a first side, a second side, a first end face, and a second end face;
    a 3D point cloud system within the housing and including a rotating mirror, the 3D point cloud system configured to acquire 3D point cloud data of a scanned environment;
    a first color camera arranged within the housing on the first side and configured to capture respective color data of the scanned environment;
    a second color camera arranged within the housing on the second side and configured to capture respective color data of the scanned environment; and
    the first color camera has a field of view between +5° and +80° relative to a horizontal plane and the second color camera has a field of view between −65° and +10° relative to the horizontal plane.

2. The scanner of claim 1, wherein the first color camera has a first optical axis projected in a first direction relative to the housing.

3. The scanner of claim 2, wherein the first optical axis has an angle of 34° relative to the horizontal plane, wherein the horizontal plane is parallel to a surface on which the scanner is positioned.

4. The scanner of claim 2, wherein the first optical axis has an angle of 9° relative to a vertical plane, wherein the vertical plane is perpendicular to the horizontal plane.

5. The scanner of claim 1, wherein the second color camera has a second optical axis projected in a second direction relative to the housing.

6. The scanner of claim 5, wherein the second optical axis has an angle of 27° relative to the horizontal plane, wherein the horizontal plane is parallel to a surface on which the scanner is positioned.

7. The scanner of claim 5, wherein the second optical axis has an angle of 9° relative to a vertical plane, wherein the vertical plane is perpendicular to the horizontal plane.

8. The scanner of claim 1, wherein the 3D coordinate scanner includes an internal color camera configured to capture zenith color data that is reflected on the mirror.

9. The scanner of claim 1, further comprising a zenith color camera within the housing on the top and configured to capture respective color data of the scanned environment.

10. The scanner of claim 1, further comprising a zenith color camera having a field of view between +77° and 90°.

11. The scanner of claim 1, wherein a field of view of the first color camera overlaps a field of view of the second color camera when pointing in the same direction.

12. A method of scanning an environment, the method comprising:
performing a three-dimensional (3D) point cloud data acquisition operation of a scanned environment using a 3D coordinate scanner;
performing a first color data collection operation of the scanned environment using a first color camera positioned on a first side of the scanner; and
performing a second color data collection operation of the scanned environment using a second color camera positioned on a second side of the scanner, opposite the first color camera; wherein the first color camera has a field of view between +5° and +80° relative to a horizontal plane and the second color camera has a field of view between −65° and +10° relative to the horizontal plane.

13. The method of claim 12, wherein the first color data collection operation and the second color data collection operation are performed simultaneously.

14. The method of claim 12, wherein the first color data collection operation and the second color data collection operation are performed simultaneously with at least a portion of the 3D point cloud data acquisition operation.

15. The method of claim 12, further comprising performing a zenith color data collection operation using the scanner to capture color data at a zenith relative to the scanner.

16. The method of claim 15, wherein the zenith color data collection operation is performed using an internal camera within a housing of the scanner and reflected off a mirror of the environment scanner.

17. The method of claim 15, wherein the zenith color data collection operation is performed using a color zenith camera arranged on a top of a housing of the scanner.

18. The method of claim 12, wherein a plurality of first images are captured using the first color camera and a plurality of second images are captured using the second color camera, wherein a portion of each first image overlaps a portion of at least one second image.

19. The method of claim 12, wherein a plurality of first images are captured using the first color camera and a plurality of second images are captured using the second color camera, wherein a portion of each first image overlaps a portion of at least one additional first image and a portion of each second image overlaps a portion of at least one additional second image.

20. A method of scanning an environment, the method comprising:
performing a three-dimensional (3D) point cloud data acquisition operation of a scanned environment using a 3D coordinate scanner;
performing a first color data collection operation of the scanned environment using a first color camera positioned on a first side of the scanner; and
performing a second color data collection operation of the scanned environment using a second color camera positioned on a second side of the scanner, opposite the first color camera;
wherein:
the first color camera has a first optical axis projected in a first direction relative to the housing, the first optical axis having at least one of an angle of substantially 34° relative to a horizontal plane that is parallel to a surface on which the scanner is positioned, and an angle of substantially 9° relative to a vertical plane that is perpendicular to the horizontal plane; and
the second color camera has a second optical axis projected in a second direction relative to the housing the second optical axis having at least one of an angle of substantially 27° relative to the horizontal plane, and an angle of substantially 9° relative to a vertical plane that is perpendicular to the horizontal plane.

* * * * *